May 1, 1945. E. V. RIPPINGILLE 2,374,834
PROPELLER CONSTRUCTION
Original Filed May 22, 1939 7 Sheets-Sheet 1
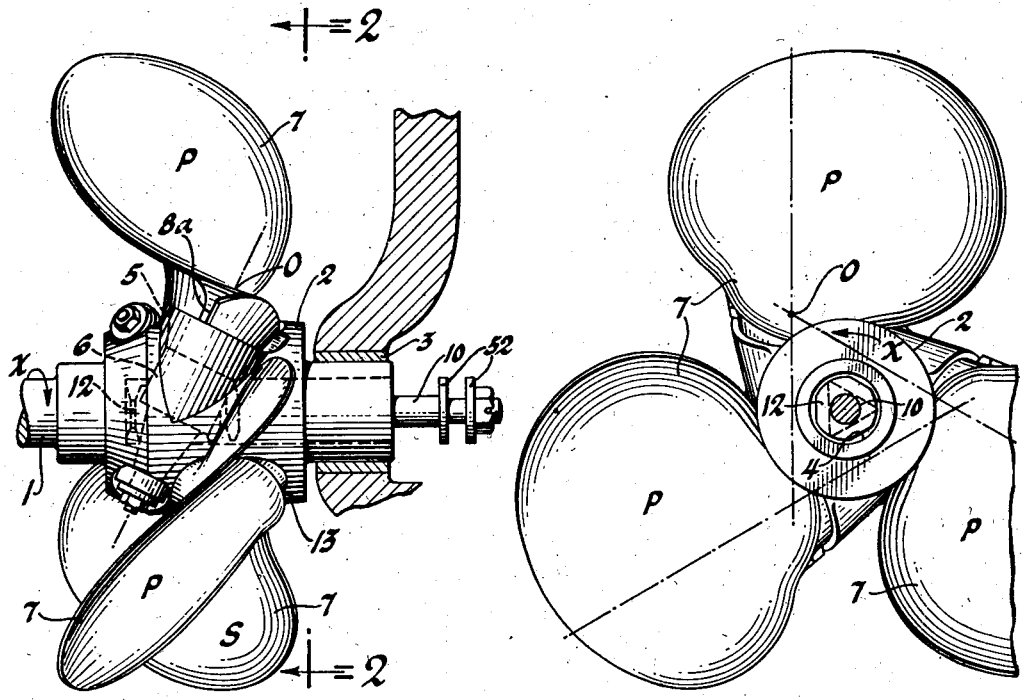
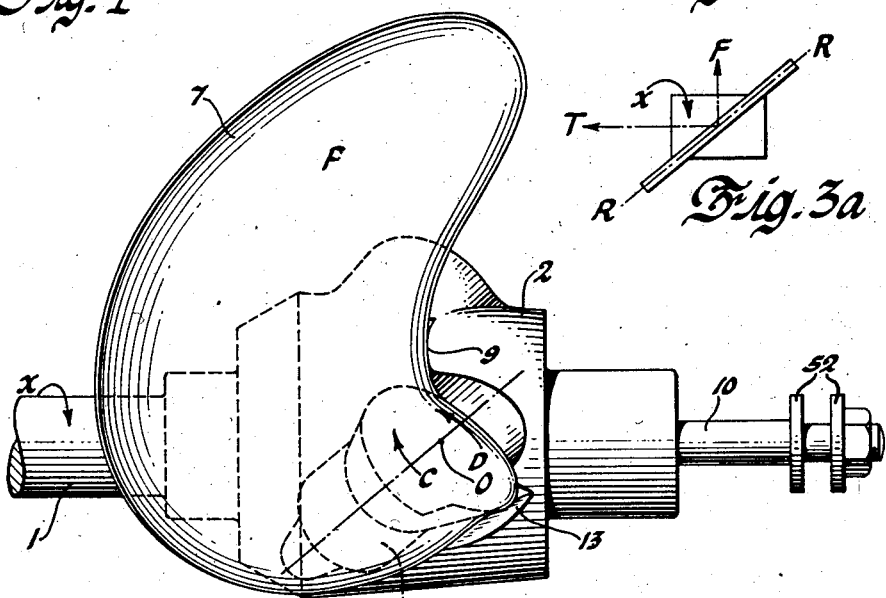
Edward V. Rippingille
Inventor
By Blackmore, Spencer & Flint
Attorneys

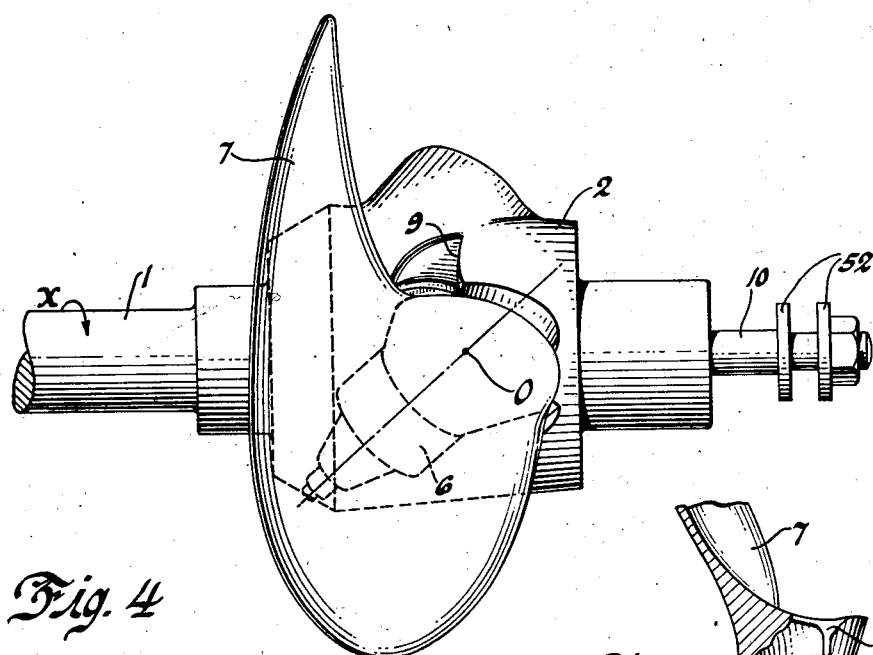
Fig. 4
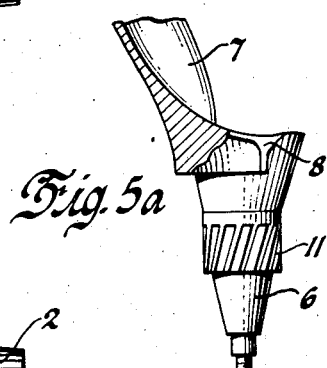
Fig. 5a
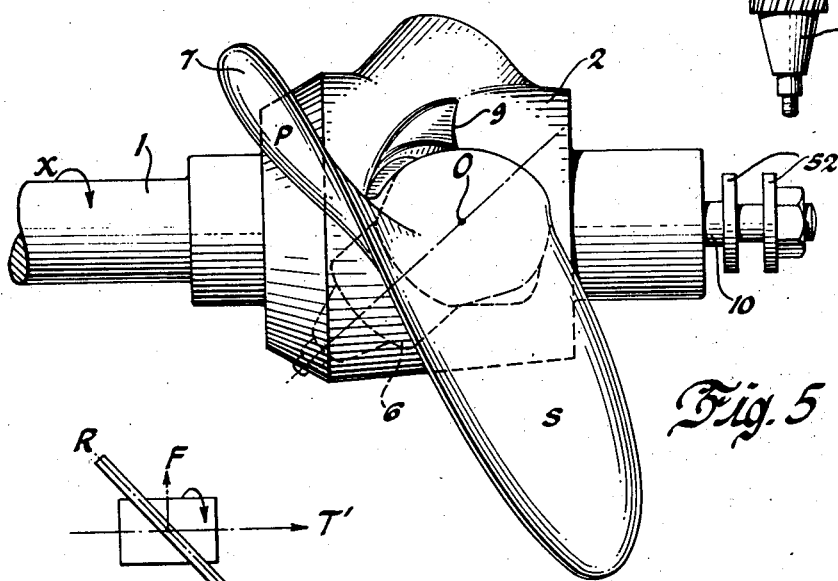
Fig. 5
Fig. 5b
Edward V. Rippingille
Inventor
By Blackmore, Spencer & Flint
Attorneys May 1, 1945.  E. V. RIPPINGILLE  2,374,834
PROPELLER CONSTRUCTION
Original Filed May 22, 1939  7 Sheets-Sheet 3
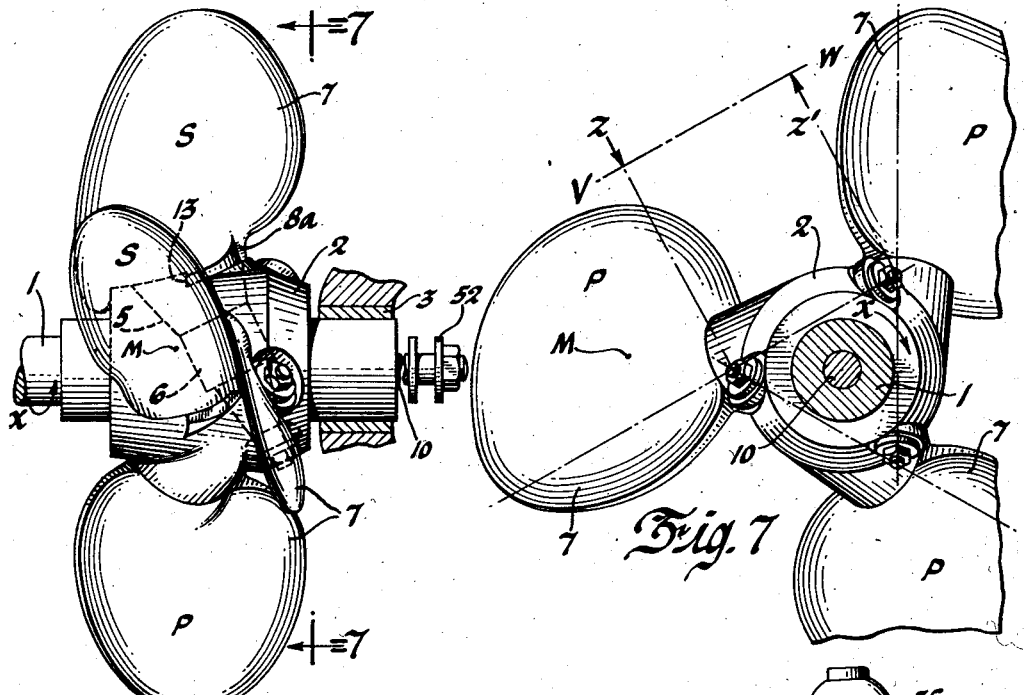
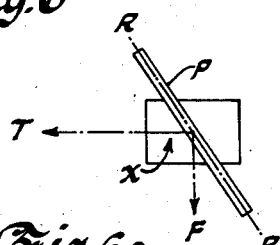
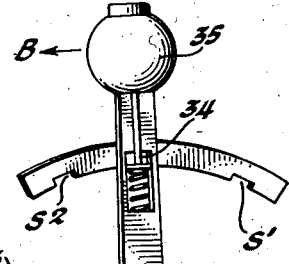
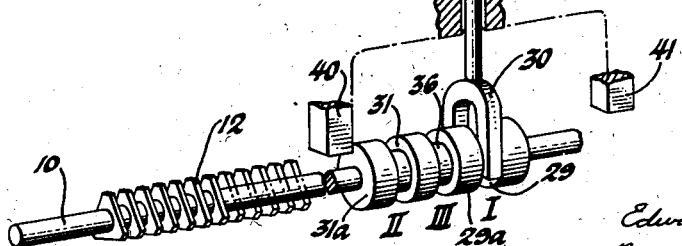
Edward V. Rippingille
Inventor
By Blackmore, Spencer & Flint
Attorneys

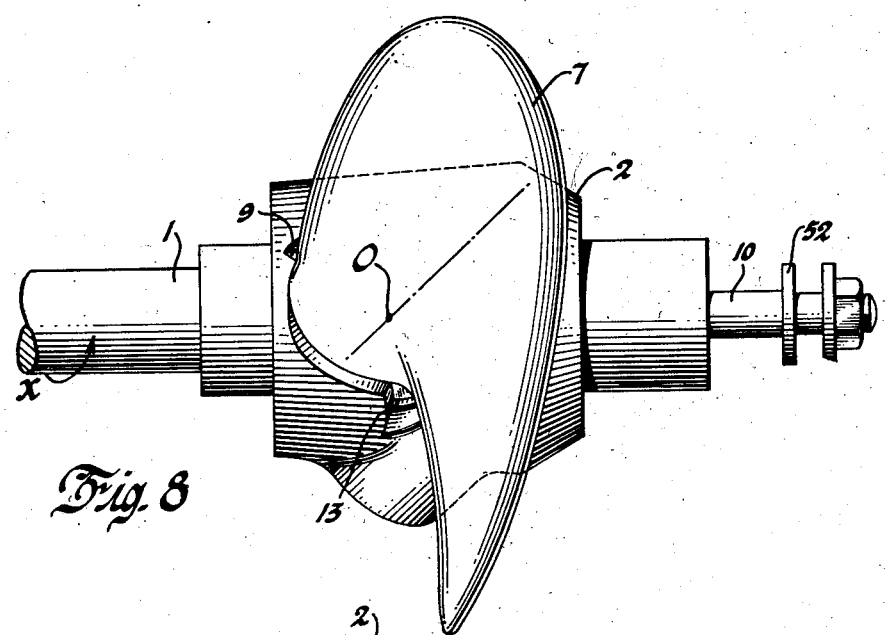
Fig. 8
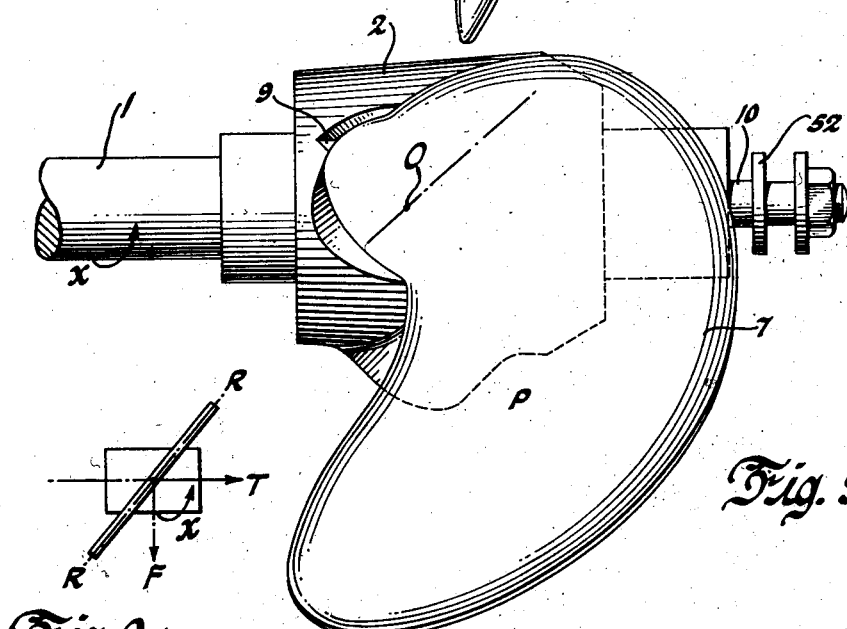
Fig. 9
Fig. 9a

May 1, 1945.　　E. V. RIPPINGILLE　　2,374,834
PROPELLER CONSTRUCTION
Original Filed May 22, 1939　　7 Sheets-Sheet 6

May 1, 1945. E. V. RIPPINGILLE 2,374,834
PROPELLER CONSTRUCTION
Original Filed May 22, 1939 7 Sheets-Sheet 7
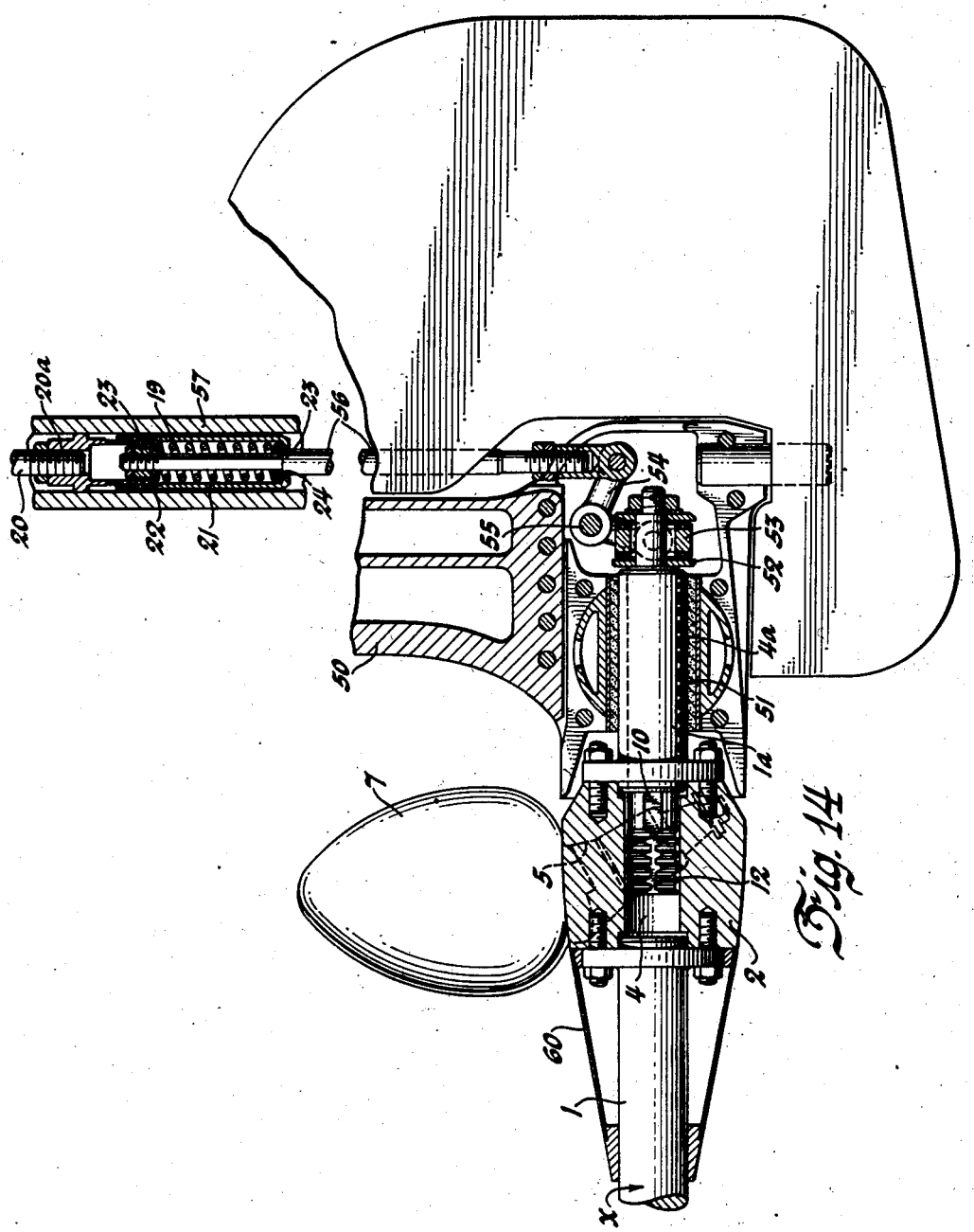

Patented May 1, 1945

2,374,834

UNITED STATES PATENT OFFICE 2,374,834

PROPELLER CONSTRUCTION

Edward V. Rippingille, Detroit, Mich., assignor to General Motors Corporation, Detroit, Mich., a corporation of Delaware Original application May 22, 1939, Serial No. 274,883. Divided and this application February 24, 1942, Serial No. 432,147

11 Claims. (Cl. 170—163)

The invention relates to articulated, multi-blade, variable pitch propellers for use in fluid media, for example, on aircraft or ships.

It is known in connection with such propellers to vary the pitch of the blades simultaneously and equally by means of a common control member, which may be located in the central portion of a hub.

The parent application, U. S. Serial Number 274,883, of which the present is a divisional, was filed May 22, 1939. It shows improvements upon such constructions by strengthening the hub while at the same time decreasing its size and increasing its slipstream efficiency, attained by disposing the articulated blade axes symmetrically, offset from the main axis, and located obliquely thereto, so as to form skew lines therewith. In the parent application are shown modes of construction in which the blades are mounted either at the forward ends of their spindles to provide what is termed "forward rake"; and are shown mounted at the rearward ends to provide "aft" rake, the former mode, however, being preferred since it permits increased strength and efficiency for equal bulk of hub, and further provides other desirable control characteristics, for example, that of counteraction of reaction thrust by centrifugal force to obviate jamming of the spindles in their bores. The parent application also provides in this general form of construction the feature of counter-balancing blade thrust and centrifugal force such that the external control forces for setting pitch may be small, and within the power of manual pitch shift means in certain small installations, and capable of manipulation by low power servo shift means in larger installations.

Given the benefits of the construction of the parent application, one may conveniently combine with the controls, mechanisms affording automatic pitch adjustment of the blades because of the low servo power requirement; and may combine therewith means for controlling the rate of pitch shift, cushioning means effective at the limit of desired travel of the controlling means, and stop mechanisms for holding the blades in or out of positive or negative pitch positions. The present divisional application is directed toward the latter group of control means and stop mechanisms. Additional features and advantages of the invention will become apparent from the following description taken in conjunction with the accompanying drawings, in which:

Figure 1 is a longitudinal elevation of a propeller according to the invention, showing the general blade mounting arrangement;

Figure 2 is a transverse section of the hub of the propeller of Figure 1 taken on line 2—2;

Figure 3 is an enlarged elevation view of the hub and only one of the blades of the structure of Figures 1 and 2, the blade being shown in forward pitch;

Figure 3a is a schematic diagram showing the thrust and torque forces acting on the blade of Figure 3;

Figure 4 is a view similar to that of Figure 3, but with the single blade shown in approximate zero pitch;

Figure 5 is a view similar to those of Figures 3 and 4 but with the single blade shown in reverse pitch;

Figure 5a is a part section of the blade of Figures 3, 4, and 5, showing the stop mechanism and the spindle-rocking teeth of inclined pitch;

Figure 5b is a schematic diagram similar to Figure 3a based on Figure 5;

Figure 6 is a longitudinal elevation of a second embodiment of the invention, similar to that of Figure 1, but with the blade spindles raked oppositely;

Figure 10:
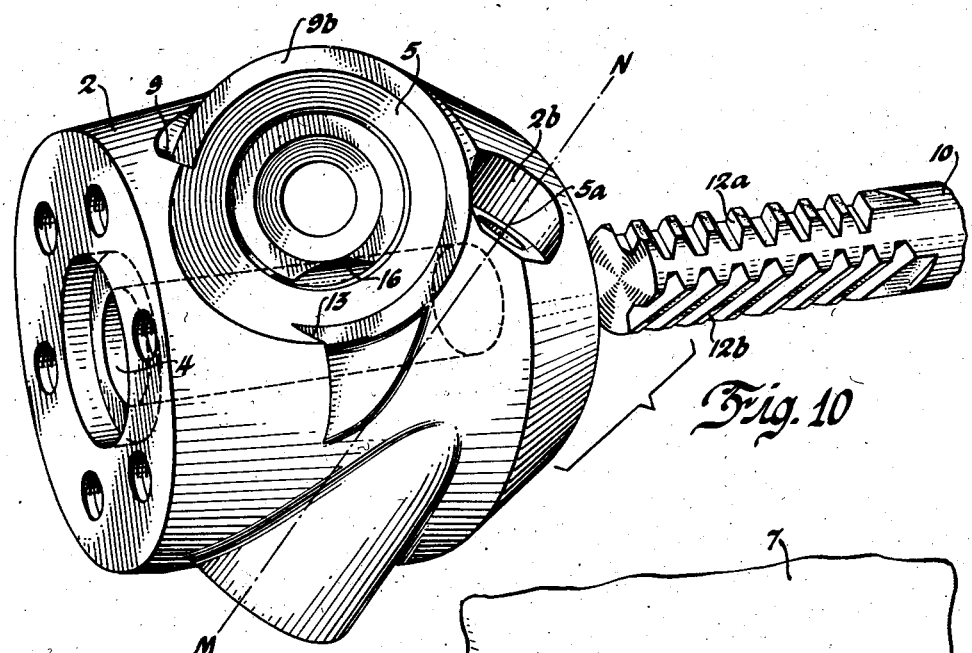
Figure 11:
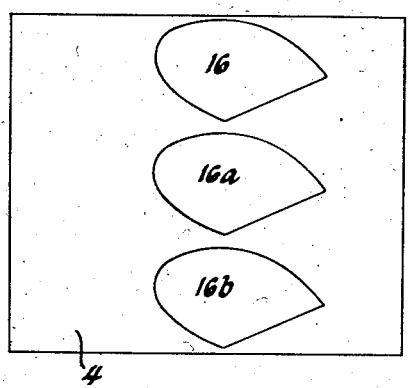
Figure 12:
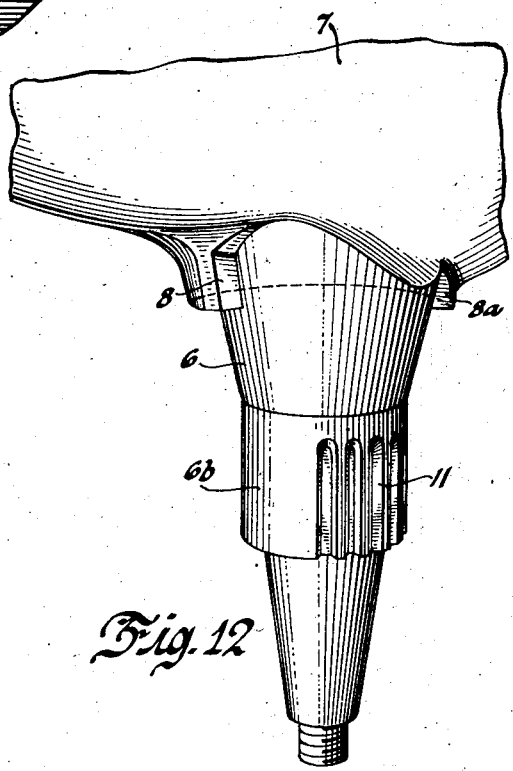
Figure 13:
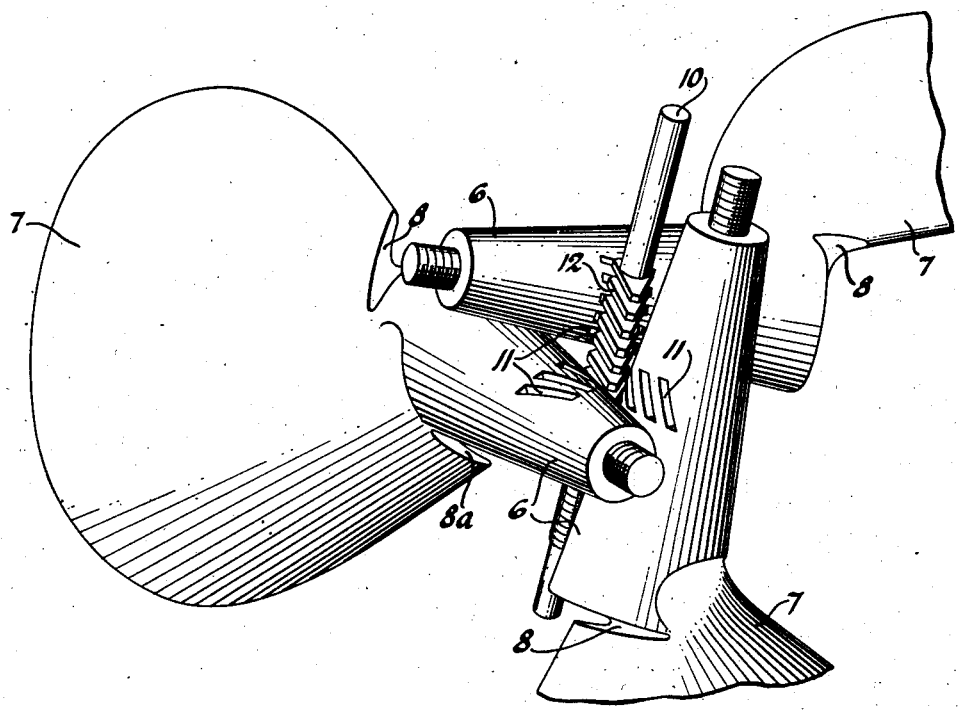
Figure 15:
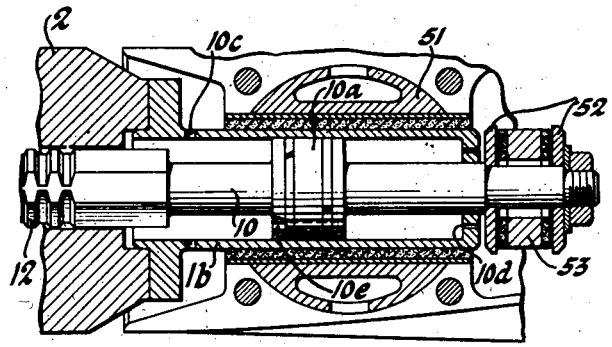
Figure 17:
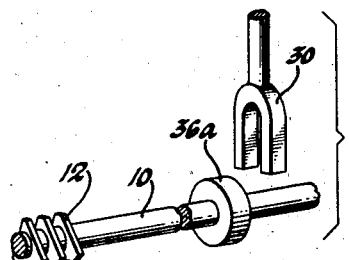

Figures 6a, 7, 8, 9 and 9a correspond to the Figures 2, 3a, 4, 5 and 5b respectively, illustrating various features of the second arrangement;

Figure 10 is a perspective view of the hub shown in Figures 6, 7, 8, and 9, with the blade removed from its bearing bore, the eye of the observer looking directly into the bore, the blade spindle operating rod being removed from the bore to illustrate the construction of the rack of the control rod;

Figure 11 shows the development of the central bore of the hub of Figure 10;

Figure 12 is an elevation view in part of the blade of Figures 8 and 9, the blade being adapted for fitting the bore of Figure 10, and illustrate the blade stops and the blade spindle construction which cooperates with the bore and the rack of Figure 10;

Figure 13 is a schematic view showing in perspective the assembly of overlapping blade spindles according to the invention and illustrating the nesting of the blade spindles and rack within the hub body;

Figure 14 is a part section elevation of a form of the invention as installed in a ship, showing the blade rocking and controlling mechanism;

Figure 15 shows a modification of the mounting and shock absorption means of Figure 14;

Figure 16 is a schematic perspective view of the operator control for shifting pitch between forward and reverse; and Figure 17 is a schematic view of a supplementary control similar to that of Figure 16, but for a different purpose.

In the various figures of the drawings showing the different positions of the blades, P indicates the pressure faces and S indicates the suction faces; while if the blades are in neutral position, no such lettering is shown.

In the construction shown in Figures 1 to 5a, a shaft 1 has a hub 2 and is mounted at its rear end in a bearing 3. It has an axial bore 4, and three oblique and symmetrically disposed bores 5 in which are mounted three tapered spindles 6 carrying blades 7 which can rotate about their axes within limits determined by stops 8 and 8a on the blades and cooperating stops 9 and 13 on the hub. The spindles 6 have helical teeth 11 (Figure 5a) which mesh with a rack 12 on a control rod 10 mounted within the axial bore 4 and provided with a collar 52 for engagement with a convenient control mechanism of which examples are hereinafter described. Thus by moving the rod 10 axially, the blades 7 are rotated about their respective axes from one limiting position to another through a null or neutral position.

In this construction the spindle axes which form with the main or shaft axis, symmetrical skew lines, and the blades mounted on them, are disposed such that the blades have what is termed an "aft" rake. These spindle axes, indicated by chain-dotted lines, intersect their respective blade surfaces at points O and it will be seen, particularly from Figure 1 that the working face of the blade is in the main disposed to one side of the axis. This effects an offset of the centre of pressure, causing a twist couple C (Figure 3) which tends to rotate the blade about its axis.

The pressure diagram Figure 3a, illustrates the forces acting on a blade when set at forward pitch as shown in Figure 3. The shaft rotates in the direction of arrow $x$ and the forces on the blade, indicated for simplicity by the plane surface R—R, are resolved into a forward axial thrust T and a transverse tangential thrust F. Due to the aft rake of the blades, the resultant thrust tends to force the spindles on their seatings, but this thrust is counteracted by centrifugal force. The twist on the blade itself rotates the spindle until the stop 8 on the blade abuts against the stop 9 on the hub.

When the driving torque is decreased and the pressure surface P becomes a suction surface S, the twist couple C (Figure 3) is countered by a couple D and eventually the blade twists such that the stop 8 moves from the stop 9, until the neutral or null position of Figure 4 is reached. In addition to this change of twist torque on each blade itself, the driving torque is changed in direction and the thrust on the spindles becomes negative, thus tending to overcome centrifugal force.

Further movement of each blade as allowed or caused by the control mechanism, brings them to the position shown in Figure 5 which is the reverse drive position and of which Figure 5a is the associated force diagram. It will be seen that the hub stop 9 is cleared of the blade and that a pull $T^1$ has replaced the thrust T of Figure 3a.

Between these two extreme positions and the neutral or null position of Figure 4 respectively, the blades will take up an equilibrium position according to the driving torque and relative stream velocity, if the control mechanism allows of such free movement. The operator will select either a forward or reverse movement initially.

The construction shown in Figures 6 to 9 differs from that of Figures 1 to 5a by the disposition of the blade axes. Whereas in Figures 1 to 5a they have an "aft" rake, in Figures 6 to 9 they have a "forward" rake. The effect of this is that the driving thrust on each blade tends to lift the spindles 6 off their seatings and thereby help centrifugal force. With over-running torque, the thrust counteract centrifugal force.

Figures 6 and 6a show the normal forward drive position, causing an axial thrust T and a tangential thrust F. In Figure 8 the single blade shown is in the neutral or null position; while in Figure 9 it is in the reverse position, which produces as shown in Figure 9a a pull $T^1$ in place of the thrust T.

There is some advantage in the construction of Figures 6 to 9 over that of Figures 1 to 5a and this is that to accommodate the reaction couple transversely of the blade spindle, between the lines V—W of Figure 7, the hub which sets up an opposite couple Z, $Z^1$ must be built up more heavily at the forward end. This lends itself better to fluid-flow efficiency with a forward rake structure, than with an aft-rake structure where the more bulky projection is at the rear. There is the advantage in common with that of Figures 1 to 5a in that by the oblique disposition of the blade axes, the bearings for the spindles can be lengthened and lower loading and maximum resistance to cocking stress can consequently be obtained.

As regards the pressure on each blade, the greater part of the latter is to one side of its respective axis, so that the center of mass M (Figures 6 and 7) is offset therefrom, and the centre of pressure is likewise offset, the effect being that the centrifugal moment and the pressure moment are of opposite signs and the couples tend to balance.

Figures 10 to 12 show parts of this second construction in more and enlarged detail, the hub 2 being seen along a spindle axis, and with the rod 10 removed. The stops 9 and 13 are clearly shown in Figure 10, and the cooperating stops 8 and 8a are shown in Figure 12. The teeth 11 on the spindle 6 are in this example straight cut and engage with the rack teeth 12a, 12b through the respective apertures 16, 16a, 16b in the bore 4 which is shown in developed form in Figure 11.

The assembly of three blades 7 relative to one another and to the rack 12 is shown in Figure 13 without any hub. In this construction the spindles 6 are conical and the teeth 11 are inclined to cooperate with the straight teeth of the rack.

Various types of control mechanisms for the propellers above described are shown in Figures 14 to 17.

Attention is directed to Figure 17, in conjunction with the external controls of Figures 16 and 14. These external controls are described in detail further in this specification. Figure 17 shows a neutral stop controlled by the operator, for preventing the blades from shifting through neutral pitch position, unless the operator determine to make a change between forward and reverse.

It is also within the scope of the invention to cause the rod 10 and rack 12 to be locked by the controls in idling position so that the power plant may start and rotate shaft 1 without propelling the ship, the mechanism furnishing a "no-drive" control similar to that of an automotive main clutch, or by analogy, the null ratio control of an infinitely variable transmission. This makes it possible to warm up an engine or series of engines with the drive gear engaged, while permitting the propeller to idle with no shaft torque other than that of churning drag in the water, with no ship propelling component such as T.

Figure 16 is provided to show a "lock-in" control auxiliary to the control applied to shift rod 10 and rack 12 to forward or reverse pitch positions. The lock-in control is described in detail later on in this specification, and is for the purpose of holding the blades positively in forward, neutral or reverse pitch positions.

Now if the operator release the locking means holding rod 10, rack 12 and blades 7 in idling or zero pitch position, and shifts the control to "forward," the engine speed control need not be immediately advanced, and the interaction of the components described may serve to rotate blades 7 toward forward position against stops 9. To prevent sudden shock the rod 10 may be dashpotted as indicated in Figure 15 so that a predetermined time interval may elapse during which the lugs 8 may advance to full abutment with stops 9. Shock is further avoided by the making of the thrust receiving parts including the shaft 1, of material having a predetermined degree of resiliency. The dashpot device protects the mechanism against quick response to sudden increase in throttle settings.

Figure 14 describes the invention as installed in a ship. The sternpost framing extension or propeller strut 50 supports the overhanging propeller shaft 1 extending from the hull at the left, and also supporting the ship's rudder, not numbered.

The drawing of Figure 14 shows propeller shaft 1 connected to a ship's engine at the left, and bolted to hub 2. Blades 7, of which only one of three is shown, are mounted in bearing bore seats 5 by their spindles 6, as previously described in connection with Figures 6 to 10. Fairing 60 attached to hub 2 and shaft 1 provides a proper leading contour to the hub for the water stream.

The ship's sternpost frame 50 is extended in the conventional manner to support the bearing assembly 51 which carries stub shaft 1a bolted to the right-hand portion of hub 2.

Bore 4 of hub 2 is continuous with bore 4a of shaft section 1a, and shift rod 10 located therein terminates at the left in rack 12, and is equipped with collar 52 accommodating the fork 53 of bellcrank 54 pivoted to the framing at 55. Bellcrank 54 is pivoted to vertical rod 56.

Sleeve 19 surrounds the assembly of parts of the coupling arrangement joining rod 56 to control rod 20 through hollow threaded coupling member 20a and acts as an abutment at either end to limit the compression motion of spring 21, which seats above under collar 22 which in turn bears below against shoulder 23 of rod 56. A similar shoulder of rod 56 engages collar 24. Hub 2 has forward stop 9 and reverse stop 13 against which lugs 8 and 8a of blades 7 may rock at extreme pitch positions, such as are shown in detail in Figures 10 and 12.

*Operation*

When the force applied to the blades 7 tends to rock them to full driving position against the forward stop 9 or the reverse stop 13, the last increment of travel of the elements moving with change of pitch is arranged by proper dimensioning parts of cushion against the load of spring 21. If there be a sudden advance of engine throttle with acceleration applied to shaft 1 and hub 2, the force storage of spring 21 prevents slamming of the lugs 8 or 8a against either of stops 9 or 13.

When the ship's engine throttle be retarded, the overtaking torque effect described above may rotate the blades 7 so that the lugs 8 depart from forward stops 9 and move toward the zero pitch position of Figure 8. Each advancing and retarding of the throttle mechanism controlling the drive to shaft 1 therefore may have the effect of causing the propeller assembly to "freewheel," and at idling speeds places the blades in a minimum pitch position to be quickly reversed, should the control of rod 10 be desired to shift the blades 7 to negative pitch position thereafter.

Now if the operator attempt to shift the rod 10 and rack 12 to rock the blades 7 and the segments 11 to reverse pitch, that is, to positions where the helix angle of the blades is that of a right-hand screw as in Figure 9, the residual drag of the water on the blades may quickly rock them toward idling position, therefore very little force is required to rock the blades further to full negative pitch in abutment with the reverse stops 13 of Figure 10.

Subsequent opening of the engine throttle or throttles may then apply force components to rock the blades 7 so that the lugs 8 are held in abutment with reverse stops 13 as long as positive torque is applied to the shaft 1, by the same principles and relationships which kept the blades 7 at their efficient forward pitch angles, described preceding.

Drive in reverse may then proceed indefinitely, each opening of the throttle rocking the blades to their full permitted limit of negative helix angle; and reduction of the throttle to idling commensurately causing the blades to rock back toward zero pitch or idling positions.

As in forward drive, the external control for rod 10 may be arranged to stop the reverse drag effect on the blades at zero pitch, in order to permit the same degree of throttle maneuvering of the blade pitch in reverse that is afforded in forward drive.

As will be described further, a ship often must be maneuvered in such close quarters that a useful degree of propeller engine braking be made available. If the self-adjusting propeller is used, it may freewheel so that little or no braking can be had. It is therefore useful to be able to hold and lock the controls for the blades in either maximum forward or reverse driving pitch position, in opposition to any reaction torque effect. For this purpose the control diagram of Figure 16 is utilized. With this arrangement of elements the rack rod 10 is locked against axial yielding, the forked stop 30 intersecting the collar slot 29 of rod 10 when operator control lever 35 is moved from position S¹ to position S². Likewise, with the same engine and propeller braking effect desired in reverse drive, the stop 30 intersects the collar slot 31 of rod 10, preventing reactive torque from rocking the blades from maximum negative angle position in reverse, as when the engine is decelerated by idling the throttle. The slot 36 is for locking the blades in zero pitch positions, as is obvious from the construction. Fixed stops 40 and 41 block stops 31a and 29 at the extremes of motion.

Rod 10 is, of course, further controlled for position by servo and manual means conditioned by spring 21, such as shown in Figure 14 described preceding.

Figure 16 is schematic, showing merely the principle of locking in the controls, the Roman numerals I and II indicating the forward and reverse locking stop positions, and III indicating neutral lock. Pawl 34 of lever 35 in notch S¹ locks the fork stop 30 in non-active position, and in notch S², holds the lever 35, rod 33, bellcrank 32 and fork 30 in active position in either one of collar slots 29 or 31, or in the neutral slot 36.

In Figure 15, the method of controlling the rate of change of the blade pitch of the construction of Figure 14 consists of a piston concentric with rod 10, mounted in cylindrical sleeve 1b, affixed to hub 2, the vent holes 10c and 10d serving to limit the time period of exhaust and of filling of the water trap spaces at either end of the cylinder 1b. The spherical bearing 51 performs the same function as in Figure 14, that of permitting deflection of the shaft and strut without binding. Rod 10 is manipulated between forward and reverse pitch positions by rocking of the external connections to fork 53, which reciprocates collar 52 and rod 10. This dashpot control of rate of pitch shift may be used directly with the construction of Figure 14, or with other forms of external control. Due to the dimensions of the orifices 10c and 10d, the mechanism is prevented from abrupt shifting to or from full pitch positions. When moving toward the left hand position, with the piston having traveled far enough to seal the orifices 10c, the water trapped behind the piston 10a can only leak out very slowly through the space between the bore 4 of hub 2 and the rod 10. This serves to give a cushioned stop effect, upon shifting to the reverse pitch position of Figure 9.

When shifting to forward pitch, the rate of motion of piston 10a is controlled by the orifice dimensions at 10d. It eventually abuts the end wall of cylinder 1b, simultaneously with the abutment of forward stops 8 of the blades of Figure 12 against hub stops 9 of Figure 10. If desired, the orifices 10d may be made radial in an extension of cylinder 1b to the right, so as to provide an identical water trap cushion effect for the shift to forward pitch. Further orifice action may be utilized such as indicated by the passage 10e in dashed lines, connecting the cylinder spaces on either side of piston 10a through the body of the piston. While the latter may be used alone without the expedient of the orifices 10c and 10d, it is deemed advisable for the mechanism to be self-cleaning, which latter effect is rendered more positive by complete change of water in the cylinder 1b at every full cycle of operation.

In the case of the self-adjusting pitch propeller, the dashpot serves to prevent fluttering or rapid oscillations of the blades and shift mechanism, yet without restricting the external control operations.

The small schematic drawing of Figure 17 shows control fork 30 operated from a mechanism such as in Figure 16, and arranged to intersect stop collar 36a of rod 10 and rack 12. The longitudinal spacing of the collar 36a with respect to the fixed longitudinal position of fork 30 is such that the blades of the arrangement of Figures 6 to 12, for example, are always at a forward pitch angle when the collar 36a is to the right of the stop fork 30, and always at a negative pitch angle when the collar 36a lies to the left of the fork 30. This mechanism is adapted to permit the use of a self-actuating blade which rotates on its spindle between maximum and minimum forward or reverse pitch, but prevented from going through neutral pitch until the operator remove the fork 30 from the path of motion of rod 10 and collar 36a.

With this control, the operator may set rod 10 at any desired pitch angle, either in forward or reverse, by means of the external control of Figure 14, for example, but to shift through neutral pitch from forward to reverse, or from reverse to forward, it is necessary to lift fork 30 by the auxiliary control of Figure 16, or by a similar contrivance.

This is distinct from the Figure 16 stop arrangement, which is a purely "lock-in" type of control, for positive operating of the propeller in fixed pitch, in circumstances wherein it is desired to eliminate self-actuation in varying pitch of the blades. The Figure 17 device serves the distinct purpose of prevention of shift through neutral, while permitting variable pitch operation in definite forward or reverse pitch.

Upon reflection, it will be understood that with a self-adjusting propeller, sudden reversal of the drive by shifting rod 10 may be blocked by the resultant forces in the system, so that abuse of the device is inherently safeguarded against. For example, if the operator attempts to shift the blades to reverse or to a negative pitch angle position while the engine throttle control is open, the blade torque forces may resist motion of rod 10, so that the reaction components will hold lugs 8 against stops 9, shown in Figure 10.

However, with the engine throttles being closed, the drag forces of the water slipstream may be immediately made active to shift the offset blades toward their null or idling points, in timed proportion to the deceleration rate of shaft 1 and the connected power plant; whereupon the force to shift rod 10 to reverse need only overcome the mechanical frictions and the residual drag of the propeller in the water.

The same effects may be present with drive in reverse, when the operator may attempt to shift rod 10 suddenly to forward position. In each case it is necessary to reduce the speed of shaft 1 by reduction of the power plant throttle control, to idling, so that the torque reaction forces are low enough to be overcome by the force applicable to rod 10 by the external control means. This does not mean that the operator is kept from shifting from reverse to forward or vice versa while the ship may have way. It must be remembered that the force of way on the ship may be utilized to bring the blades back to their null positions.

The present specification, it should be understood, is descriptive of the features of novelty which relate to the external controls of the disclosure of my U. S. Serial Number 274,883, filed May 22, 1939, and describing a novel construction of articulated propeller blade and hub assembly.

While the improvements herein are illustrated and described with some degree of specific disclosure, it should be realized that in practice various alterations and changes may be made in structures such as described by me, and that these improvements may be embodied in a number of different constructions in other ways than specifically shown. The present disclosure is, therefore, only sufficient to illustrate certain embodiments demonstrative of the nature of the improvement, and I reserve the right to change the form of the structural details as herein presented and to otherwise alter the arrangements of the parts without departing from the spirit or scope of the improvements, or the scope of the appended claims.

I claim:

1. A composite propeller drive embodying a power shaft and a unitary hub concentric therewith, and a set of movable blades adapted to rock through equivalent pitch angles, symmetrically inclined bearing recesses bored through the body of said hub adapted to receive and afford bearing surfaces supporting the spindles of said movable blades, the axes of said recesses being symmetrically inclined to planes intersecting the hub axis at right angles, the axis of each of said recesses lying in one plane parallel to the hub axis and intersecting all other planes through the hub axis, said movable blades being mounted in said recesses to a bearing fit extending through said recesses and adapted to rotate on said axes between positive and negative helix angle positions with respect to the centerline of said shaft, a central axial bearing bore in said hub, a control device sliding in said axial bore acting as a bearing operative to rock said blades equally between predetermined positive and negative pitch positions, external control means acting upon said device and capable of positioning the same for the required follower movement of the blades, stop mechanism for said device consisting of a plurality of stop members movable with an element of said device and a shiftable stop member operative to coact with one of said movable stop members for locking the said device in forward, neutral and reverse pitch positions, and positioning means for causing coaction of said members at said positions and operative independently from the operation of said device.

2. In the construction of claim 1, the combination with the positioning means of a shifting and locking mechanism for the said shiftable member having a shifter lever and a cooperating locking apparatus with lock positions corresponding to the said coaction positions of said members, in one of said positions preventing shift of the said blades through neutral pitch.

3. In the construction set forth in claim 1, the sub-combination of the control device being connected to a cushioning stop mechanism, and thereby being adapted to regulate the rate of travel of the said control device toward or away from one of its operating positions for forward or reverse drive while establishing the positive or negative helix angle positions of the said blades.

4. A composite propeller embodying a hub, a plurality of rigidly interconnected inclined rocking blades mounted in said hub for synchronous pitch setting and adapted to operate in a fluid medium, a central bore in said hub, means for rocking said blades located in said bore, and motion controlling means connected with said rocking means effective to control the predetermined rate of motion of said rocking means by controlling the flow of said fluid medium within said motion controlling means.

5. A composite propeller comprising a unitary hub rotatable concentrically with a power shaft, bearing bores in said hub symmetrically inclined with respect to the axis of said shaft and with respect to planes intersecting said axis at right angles the axis of each of said bores lying in a plane parallel to the hub axis and intersecting all other planes through the hub axis, propeller blades spindled in said bearing bores for rocking between forward and reverse pitch positions and equipped with stops formed in said blades, mating stops integral with said hub formed within the external contour of the hub and adapted to abut the stops of said blades at maximum forward and reverse pitch positions thereof, a reciprocating control member concentric with said shaft arranged to rock said blades between said hub stops, shifting means for said member and control means for said member operative to lock the member in forward, neutral or reverse pitch positions determined by said shifting means.

6. In a propeller drive, in combination, a power shaft, a unitary hub affixed to said shaft, a plurality of movable propeller blades adapted to be rotated by said hub, spindles for each blade, bearing recesses in said unitary hub adapted to receive said spindles, the axes of said recesses lying at angles oblique to planes intersecting the axis of rotation of said shaft the axis of each of said recesses lying in one plane parallel to the shaft axis and intersecting all other planes through same bearing surfaces formed between said spindles and said recesses capable of supporting thrust and centrifugal force applied to said blades and spindles by rotation of said shaft, stops integral with said blades and said hub respectively for limiting rotation of said blades on their said spindles in forward and reverse pitch positions, inclined segmental teeth movable with each of said spindles, and a meshing rack member movable longitudinally within said hub and said shaft and engaging the segmental teeth of all of said spindles for equal angular movement between said forward and reverse stop positions.

7. A composite propeller embodying, a shaft, a one-piece hub affixed thereto, symmetrically inclined bores extending through the body of said hub offset from the axis of said shaft and hub with each of said bores being symmetrically inclined to planes intersecting the hub axis at right angles, the axis of each of said bores lying in one plane parallel to the hub axis and intersecting all other planes passing therethrough, mating bearing surfaces formed in said bores and on said spindles adapted to sustain blade thrust and centrifugal forces caused by rotation of said shaft and by the resistance of the media in which the propeller operates, a plurality of variable pitch blades adapted to provide forward and reverse pitch drive, with spindles for each of said blades extending through and occupying said bores, coacting stops formed in the material of said spindles and in the body of said hub for locating the maximum allowable pitch limits of rotation of said blade spindles for said forward and reverse pitch settings, pitch shifting means connected to rotate said spindle when power is applied to said shaft, and separate stop mechanism for holding said pitch shifting means in forward, neutral and reverse pitch settings, said mechanism consisting of a plurality of stop members movable with said means and a fixed-position stop member intersecting the motion of said means at said settings.

8. In propeller devices having movable blades subject to forces tending to vary the pitch of said blades in accordance with thrust and centrifugal forces applied to said blades, and tending to equilibrate said forces in a given speed range while under a given thrust; a propeller shaft, a propeller hub, blade spindle bores symmetrically located in said hub, articulable blades having spindles supported in said hub for variable pitch motion over a predetermined pitch range, a control mechanism providing simultaneous pitch movement of said blades and adapted to move with reactive forces generated by thrust and centrifugal force on said blades, and external control means for said mechanism operative to provide a stopping action resisting such forces transmitted from said blades to said mechanism while yielding to said transmitted forces over a limited range of movement prior to said stopping action becoming effective.

9. In propeller devices having movable blades subject to forces tending to vary the pitch of said blades in accordance with thrust and centrifugal forces applied to said blades, and tending to equilibrate said forces in a given speed range while under a given thrust; a propeller shaft, a propeller hub affixed thereto, blade spindle bores symmetrically located in said hub articulable blades having spindles supported in said hub for variable pitch motion over a predetermined pitch range, a control mechanism providing simultaneous pitch movement of said blades and adapted to move with reactive forces generated by thrust and centrifugal forces on said blades when these forces are not equilibrated, external control means for said mechanism operative to provide a stopping action resisting such forces transmitted from said blades to said mechanism, yielding means embodied in said control means effective to absorb said transmitted forces over a limited range of movement of said control means prior to said stopping action becoming effective, and cooperating means limiting the rate of movement of said control mechanism in response to said reactive forces acting on the latter and limiting also the rate of movement of said control mechanism under pitch shifting force applied to said external control means.

10. In marine propellers having dirigible blades for setting in forward, neutral or reverse pitch, a propeller shaft and a hub attached thereto, symmetrically inclined blade spindle bearing bores in said hub with bore axes inclined to planes intersecting the hub axis at right angles, each bore axis lying in one plane parallel to the hub axis and intersecting all other planes through the axis of said hub, the projection of the said bore axes upon a plane at right angles to the hub axis centerline denoting a figure of intersection lying within the body of said hub, while the projection of said bore axes upon planes parallel to the said hub axis lie wholly within the projected outline of said hub, blades having spindles rotatable in said bearing bores through commonly operative mechanism, the working face of each of said blades being offset from and at an angle to the axis of its respective spindle for providing in combination with the said inclined spindle bore arrangement of the said hub effective drive in both forward and reverse pitch, the mass and thrust angles of the said working faces being so taken that during rotation of the said hub and blades, the forces upon said blades are tending to diminish the loading of said spindles in said bearing bores, means to shift said blades between forward and reverse pitch positions, removable stop means including stop members movable with said blade shift means and a fixed-position stop member intersecting the motion of said means effective to hold said blades in neutral position when said first named means has shifted them to said neutral position and an operator-operated control to cause said fixed-position stop member to intersect said motion or to be released therefrom.

11. In the combination set forth in claim 10, the subcombination of a control mechanism for said removable stop means having a latch to hold said mechanism in selected pitch positions including the said neutral position, said mechanism being independently operated with respect to the said pitch shift means.

EDWARD V. RIPPINGILLE.